(12) United States Patent
Nagase et al.

(10) Patent No.: US 7,813,031 B2
(45) Date of Patent: Oct. 12, 2010

(54) IMAGE DISPLAY DEVICE

(75) Inventors: Tatsuya Nagase, Tokyo (JP); Eiichi Sakai, Kanagawa (JP); Shigeki Takenouchi, Tokyo (JP); Okushi Okuyama, Tokyo (JP); Yukio Hosoya, Tokyo (JP)

(73) Assignee: Konica Minolta Business Echnologies, Inc., Tokyo (JP)

( * ) Notice: Subject to any disclaimer, the term of this patent is extended or adjusted under 35 U.S.C. 154(b) by 0 days.

(21) Appl. No.: 12/331,469

(22) Filed: Dec. 10, 2008

(65) Prior Publication Data

US 2009/0153945 A1    Jun. 18, 2009

(30) Foreign Application Priority Data

Dec. 13, 2007    (JP)    ............................. 2007-321756

(51) Int. Cl.
*G02B 26/00*    (2006.01)

(52) U.S. Cl. ...................................... 359/296; 359/245
(58) Field of Classification Search ................. 359/296, 359/245
See application file for complete search history.

(56) References Cited

U.S. PATENT DOCUMENTS

| | | | |
|---|---|---|---|
| 2002/0018043 A1* | 2/2002 | Nakanishi | ..................... 345/107 |
| 2006/0034566 A1* | 2/2006 | Wakita et al. | .................. 385/31 |
| 2006/0215253 A1* | 9/2006 | Kanbe | .......................... 359/296 |
| 2008/0278795 A1* | 11/2008 | Kim et al. | ..................... 359/296 |

* cited by examiner

*Primary Examiner*—Jordan M. Schwartz
*Assistant Examiner*—James C Jones
(74) *Attorney, Agent, or Firm*—Lucas & Mercanti, LLP (57) ABSTRACT

An image display device comprising: (i) a pair of substrates facing each other; and (ii) particles placed in a gap between the substrates, wherein at least one of the substrates is a resin substrate which is transparent and exhibits a light transmittance of 50% or more at a wavelength of 300 nm.

7 Claims, 4 Drawing Sheets

FIG. 2 (a) BEFORE VOLTAGE APPLICATION

FIG. 2 (b) AFTER VOLTAGE APPLICATION

FIG. 3 (a) BEFORE VOLTAGE APPLICATION
(SWITCH OFF)

FIG. 3 (b) AFTER VOLTAGE APPLICATION
(SWITCH ON)

IMAGE DISPLAY DEVICE

The present application is based on Japanese Patent Application No. 2007-321756 filed with Japan Patent Office on Dec. 13, 2007, the entire content of which is hereby incorporated by reference.

FIELD OF THE INVENTION

The present invention relates to an image display device wherein images are repeatedly displayed and deleted by allowing charged particles to migrate in an electric field and to an image display device wherein the substrate which constitutes the image display contains a prescribed resin.

BACKGROUND OF THE INVENTION

Heretofore, as a display device substitutable for a liquid crystal display (LCD), new display devices employing technologies such as an electrophoretic method, an electrochromic method, a thermal method, and a dichroic-particles-rotary method have been proposed. Since these technologies have the advantages described below, the applications thereof to the next generation image display devices, such as a display element for use as a personal digital assistance, or an electronic paper, have received attention. That is, the advantages include: excellent image quality close to regular printed matter since a wider viewing angle can be attained compared to a liquid crystal display, lower electrical power consumption, and the so-called "memory performance", which is a characteristic of preserving images after the power is off.

Of these technologies, the image display technology employing the electrophoretic method is such that image display is achieved by disposing a solution containing dispersed particles in a colored solution between a pair of substrates facing each other, followed by applying voltage of about several tens of volts between the substrates, to result in migration of particles in the liquid phase. As an image display technology employing the electrophoretic method, there have been proposed technologies such that a dispersed solution is contained in microcapsules, which are then disposed between a pair of substrates facing each other (for example, refer to Non-Patent Document 1). This technology is considered to be the most feasible for a practical application. However, it has the problem that maintaining a displayed image circumstances is hard to realize.

Specifically, the problem is the difference in the specific gravity between a colored solution and dispersed particles, that is, when the difference in specific gravity between them becomes excessive, the dispersed particles tend to sediment in the colored solution, resulting in a problem of achieving stable image display. For example, when dispersed particles of a high specific gravity, such as titanium oxide, are used in a colored solution of a low specific gravity, the dispersed particles tends to precipitate in the colored solution. Further, the colored solution containing a dye usually shows poor storage stability, so that it has been difficult to maintain the image quality of the display device containing a dye.

On the other hand, an image display technology without use of solutions has been proposed. For example, there exists an image display technique based on a powder migration method, in which charged particles are enclosed in a gaseous phase, and, by applying voltage, the aforesaid particles are allowed to migrate along a direction of an electric field. According to this method the aforementioned problem concerning the image display device employing an electrophoretic method may be avoided. Also, by providing a difference in mobilities of the enclosed particles based on a difference in the polarities of the particles, an image display using plural kinds of particles can be carried out. For example, a sharp image having a high level of whiteness and visibility which have not been attained by an image display device employing the electrophoretic method can be obtained by using white particles and black particles and by providing different polarities to the two kinds of particles, whereby the mobilities of the white particles and the black particles are different.

Thus, the image display technique based on a powder migration method is expected to greatly contribute to improving the image quality of an image display device of the next generation such as electronic paper.

In the image display technique based on a powder migration method, the image display is carried out by enclosing charged particles between two opposing substrates and by driving the charged particles with an electric field applied between the substrates. Accordingly, the user observes the image through a substrate. Therefore, as the substrate constructing the display, materials having some extent of light transmittance are demanded in view of assuring visibility. Glasses represented by quartz glass, or organic-glasses such as polycarbonate have been employed.

Among these glasses, organic-glasses are effective to obtain a lightweight or a thin image display device. Recently, an image display device enabling flexible deformation has been obtained by employing a flexible substrate. Thus, the material for the substrate has a tendency to be selected according to the purpose of the use and the need for a resin substrate has become higher than ever (refer to, for example, Patent Document 1).

In the image display devise based on a powder migration method, since the image is observed through the substrate as abovementioned, desired is a material for the substrate exhibiting high transmittance of light as well as excellent durability, and a resin substrate has been employed in addition to a glass substrate. However, an image display device having a resin substrate has had a tendency that the image looks darker than the image of a display in which a glass substrate is used.

The reason is assumed to be that it is difficult for a resin substrate to transmit light evenly throughout the wavelength range of the visible light. In fact, in a polycarbonate substrate or a polyethylene terephthalate substrate, the light closer to the UV region tends to be more difficult to transmit than the light of other wavelength region. Alternatively, in an image display device employing a glass substrate, a bright image has been obtained since the glass substrate transmits more light than the resin substrate in the region closer to the UV region.

Patent Document 1: Japanese Unexamined Patent Application Publication No. 2003-248247

Non-Patent Document 1: Gugrae-Jo, et al., "New Toner Display Device (I)", The Annual Conference of the Imaging Society of Japan, Jul. 21, 1999, "Japan Hard Copy '99", pp. 249-252

SUMMARY OF THE INVENTION

An object of the present invention is to provide an image display device which provides an image as bright as or brighter than the image provided by an image display device employing a glass substrate, by using a resin substrate which can transmit light evenly throughout the wavelength range of the visible light.

Namely, an object of the present invention is to provide a flexible, light-weight and thin image display device which can provide a bright image in the same level of the image obtained by using a quartz glass substrate which enables a specifically bright image among glass substrates.

One of the aspects of the present invention is an image display device comprising: (i) a pair of substrates facing each other; and (ii) particles placed in a gap between the substrates, wherein at least one of the substrates is a resin substrate exhibiting a light transmittance of 50% or more at a wavelength of 300 nm.

DESCRIPTION OF THE PREFERRED EMBODIMENTS

The above object of the present invention is achieved by any one of the following structures.

(1) An image display device comprising:
  (i) a pair of substrates facing each other; and
  (ii) particles placed in a gap between the substrates,
  wherein at least one of the substrates is a resin substrate which is transparent and exhibits a light transmittance of 50% or more at a wavelength of 300 nm.
(2) The image display device of Item (1),
  wherein the resin substrate comprises at least one of a homopolymer of 4-methyl-1-pentene and a copolymer of 4-methyl-1-pentene and an α-olefin having 6 to 16 carbon atoms.
(3) The image display device of Item (2),
  wherein the resin substrate comprises the homopolymer of 4-methyl-1-pentene.
(4) The image display device of Item (2),
  wherein the resin substrate comprises the copolymer of 4-methyl-1-pentene and an α-olefin having 6 to 16 carbon atoms.
(5) The image display device of Item (2) or (4), wherein the ratio a/b is 4 or more in the copolymer of 4-methyl-1-pentene and an α-olefin having 6 to 16 carbon atoms, wherein
  a: mass content of 4-methyl-1-pentene
  b: mass content of the α-olefin having 6 to 16 carbon atoms.
(6) The image display device of Item (2),
  wherein the resin substrate comprises a copolymer of 4-methyl-1-pentene and at least one of the following compounds 1-9:

COMPOUND 1

COMPOUND 2

COMPOUND 3

COMPOUND 4

COMPOUND 5

H₂C=CHCH₂CH₂CH₂CH₂CH₃;
COMPOUND 6

COMPOUND 7

COMPOUND 8

COMPOUND 9

(7) The image display device of any one of Items (1) to (6),
  wherein the resin substrate exhibits a light transmittance of 80% or more at a wavelength of 400 nm.

In the image display device of the present invention, uniform transmission of light throughout the wavelength region of the visible light was achieved by employing a resin substrate which exhibits 50% or more of light transmittance at a wavelength of 300 nm, which is outside of the wavelength range of the visible light. As a result, the brightness of the image has become as the same level as or brighter than the brightness of the image obtained by using a glass substrate.

Specifically, whiteness of an image which has not been attained with the image display device employing conventional polycarbonate resin or polyethylene terephthalate resin for the substrate has come to be obtained. Thus, according to the present invention, an image exhibiting whiteness of the level obtained by employing a glass substrate can be provided with a light-weight, thin and flexible image display device which could not be obtained when a glass substrate was used. As the result, increase in the use of an image display device based on a powder migration method is expected to be accelerated.

Further, in the present invention, since light of the wavelengths of 300-400 nm which is in a UV region can be transmitted through the substrate, fabrication of the cell can be conducted while carrying out cure-adhesion of the cell using a UV curable adhesive to prepare an image displaying device, whereby a secondary effect of improved productivity came to be acquired.

The present invention relates to an image display device in which the image display is carried out by enclosing charged particles into a gaseous phase between a pair of substrates facing each other and by driving the particles with applying a voltage between the substrates, and, specifically relates to an image display device produced by employing a resin exhibiting excellent transmittance of light in a wavelength region of lower end of the visible light as the substrate.

Further, the present invention is not limited to an image display device in which the image display is carried out by enclosing charged particles into a gaseous phase between a pair of substrates facing each other. The present invention is also preferably applied to other kind of image display devices, for example, an image display device in which particles are enclosed in a liquid phase between a pair of substrates facing each other.

In the present invention, by employing a resin which transmits light of a wavelength of 300 nm, which is out of the visible light region, an image display of the brightness which could not been attained when a conventional resin substrate was used has come to be carried out. It is easily come up to mind when the substrate of an image display device is selected to improve the brightness of an image by focusing on the transmittance of light in the visible light region. However, in the present invention, the transmittance of light outside the visible light region was considered, and by selecting a resin of which the transmittance of light outside the visible light region is not less than a prescribed amount, it was found that the brightness of the image of an image display device can be dramatically improved. The technique by which the brightness of the image of an image display device can be improved by selecting a resin having a characteristic feature in the transmittance of light outside the visible light region was developed for the first time by the present invention.

The reason why the brightness of an image has been improved by employing a substrate exhibiting a light transmittance of 50% or more at a wavelength of 300 nm, namely the UV region, is supposed to be as follows. The wavelength range of light which transmits the substrate was expanded by the selection of the resin, and, as the result, the amount of visible light which transmits the substrate was increased. The transmittance of light in the lower end wavelength region of the visible light largely depends on the kind of a resin, and it is considered that a resin substrate which transmits 50% or more of light of a wavelength of 300 nm exhibits a thoroughly high transmittance of light in the lower end wavelength region of the visible light. The light transmittance of the resin substrate of the present invention is preferably 80% or more at a wavelength of 400 nm or more.

Namely, when the substrate is selected only by focusing on the transmittance of light in the region of visible light, the transmittance in the lower end region of visible light cannot be exactly recognized and it is afraid that a resin having a lower transmittance in this region compared to other visible light regions may be selected, whereby the device displays only a darker image since the lower wavelength region of visible light cannot be utilized in the image display device. In the present invention, it is supposed that display of a bright image has become possible because, by prescribing the transmittance of light of a wavelength of 300 nm, visible light of the wavelength region of lower end below 400 nm has become usable for the image display and the amount of usable light has been increased since the wavelength region of transmitting light has been enlarged.

On the other hand, "a feeling of brightness" of the image display depends not only on the amount of light but also on the color hue of the image. When a conventional resin having a larger absorption of light in the lower wavelength region of the visible light is used for the substrate, the displayed image tends to have a yellow hue which results in loss of a feeling of brightness. However, since the transmittance of light in the lower wavelength region of the visible light is improved in a resin substrate exhibiting 50% or more of light transmittance at a wavelength of 300 nm, the light is evenly transmitted throughout the wavelength range of the visible light, whereby the color hue of the displayed image is notably improved and an image providing a feeling of brightness can be obtained.

Thus, the present invention has been completed by selecting a resin for the substrate of the image display device so that light of visible light region can be effectively utilized without loss, specifically, the light of the lower end region of visible light under the wavelength of 400 nm can be fully utilized in the image display.

The details of the present invention will be described below.

In the image display device of the present invention, at least one of the substrates forming a space to enclose charged particles is a resin substrate which is transparent and exhibits a transmittance of 50% or more of light at a wavelength of 300 nm, which is outside the visible light region. Namely, a display exhibiting a high level of whiteness which may not be attained by the image display device in which a conventional transparent resin is used can be obtained by employing a resin substrate which is transparent and exhibits a transmittance of 50% or more of light at a wavelength of 300 nm.

This is because the display of a bright image was realized by employing a resin substrate exhibiting a transmittance of 50% or more of light at a wavelength of 300 nm, whereby the wavelength region of light which exhibits high transmittance was expanded and, specifically, every region of visible light could be transmitted with a high level of transmission. Namely, it is supposed that, since the substrate has been selected only by focusing on the transmittance of light in the region of visible light, the transmittance in the lower end region of visible light has been relatively lower than the other region of visible light and a bright image which can be obtained when a glass substrate is used could not be obtained.

Typical examples of a resin which enables forming a substrate which is transparent and exhibits light transmittance of 50% or more at wavelength of 300 nm include: a homopolymer resin of 4-methyl-1-pentene and a copolymer resin of 4-methyl-1-pentene and an α-olefin compound having 6-16 carbon atoms. The structural formula of 4-methyl-1-pentene will be shown below.

In the copolymer resin of 4-methyl-1-pentene and an α-olefin compound having 6-16 carbon atoms, the ratio of a: mass of 4-methyl-1-pentene and b: mass of the α-olefin compound having 6-16 carbon atoms, namely a/b, is preferably 4 or more. When a film or a sheet is formed by using a copolymer satisfying the condition: a/b is 4 or more, a most preferable stiffness as a substrate of an image display device can be obtained. With respect to light transmittance of the resin substrate, the homopolymer of 4-methyl-1-pentene is preferable.

The α-olefin compound as mentioned in the present invention refers to an olefin hydrocarbon compound having a double bond at the α position, namely, between the terminal carbon atom of the structure and the neighboring carbon atom. Specific examples of an α-olefin compound having 6-16 carbon atoms will be shown below, however, the α-olefin compound usable in the present invention is not limited thereto.

$H_2C=CHCH_2CH_2CH_2CH_3$;    COMPOUND 1
(α)   (β)   (γ)   (δ)   (e)   (ζ)

$H_2C=CHCH_2(CH_2)_6CH_3$;    COMPOUND 2

$H_2C=CHCH_2CH_2CH_2CH_2CH_2CH_3$;    COMPOUND 3

$H_2C=CHCH_2(CH_2)_{10}CH_3$;    COMPOUND 4

$H_2C=CHCH_2(CH_2)_{12}CH_3$;    COMPOUND 5

$H_2C=CHCH_2CH_2CH_2CH_2CH_3$;    COMPOUND 6

-continued

COMPOUND 7

COMPOUND 8

COMPOUND 9

The abovementioned resin which enables forming a substrate which is transparent and exhibits a light transmittance of 50% or more at a wavelength of 300 nm can be obtained via a known polymerizing method of a vinyl compound, such as a radical polymerizing method by using, for example, aforementioned 4-methyl-1-pentene or an α-olefin compound having 6-16 carbon atoms as a raw material.

In the present invention, a substrate exhibiting a light transmittance of 50% or more at a wavelength of 300 nm is used. The transmittance can be determined by measuring the light using an instrument which can provide light of a wavelength of 300 nm and can measure the light transmitted through the substrate, such as a spectrophotometer. As an instrument which can provide light of a wavelength of 300 nm and can measure the light transmitted through the substrate, cited are a UV-visible spectrophotometer or a Brewer Spectrophotometer having a measuring range of 290-325 nm. Examples of a commercially available UV-visible spectrophotometer which enables measuring light of a wavelength of 300 nm include UV-2200A (produced by shimadzu corp.) and U-3500 recording spectrophotometer (produced by Hitachi, Ltd.).

The transmittance as used in the present invention refers to the ratio of total transmitted light which is a sum of parallel transmission light and diffuse transmission light which are generated when a substrate is irradiated with light of a wavelength of 300 nm based on the incident light. The transmittance of a substrate can be defined by the following Equation (1).

$$\text{Transmittance (\%)} = \left(\frac{\text{total transmission light}}{\text{incident light}}\right) \times 100$$
$$= \left(\frac{\left(\begin{array}{c}\text{parallel transmission light} + \\ \text{diffuse transmission light}\end{array}\right)}{\text{incident light}}\right) \times 100$$

Equation (1)

The "transparent substrate" of the present invention means a substrate which has a light transmittance of 50% or more at any wavelength of 400-800 nm. The light transmittance at any wavelength of 400-800 nm is preferably 70% or more and more preferably 80% or more. The light transmittances at wavelengths of 400-800 nm can be measured in the same manner as the light transmittance at a wavelength of 300 nm by using a commercially available spectrophotometer, for example, UV-2200A (produced by shimadzu corp.) or U-3500 recording spectrophotometer (produced by Hitachi, Ltd.). The light transmittance at a wavelength in the range of 400-800 nm is also defined by the above Equation (1).

Next, the specific embodiment of the image display device of the present invention will be explained using FIGS. 1(a) and 1(b).

Figure 3:
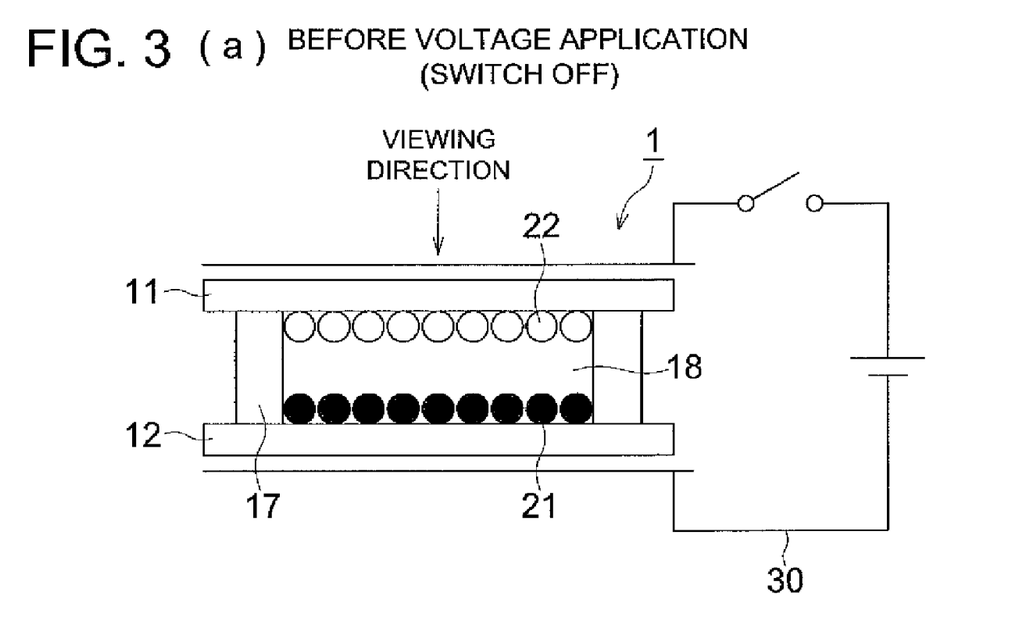
FIGS. 3(a) and 3(b) are schematic illustrations showing another example of a particle migration by application of voltage between substrates

Representative structural cross-sections of the image display of the present invention are shown in FIGS. 1(a) and 1(b). FIG. 1(a) shows that electrodes 15 are provided on substrates 11 and 12. Alternatively, the image display device as shown in FIG. 1(b) has a structure in which no electrode is provided in the device, and is designed so that an electric field is applied through electrodes which are provided in the exterior of the device to enable particles to migrate. Image display device 1 of FIGS. 1(a) and 1(b) is, as shown in the figure, designed so that an image is viewed from substrate 11, but the present invention is not limited to a structure in which an image is viewed from substrate 11. The type of image display device as shown in FIG. 1(b) exhibits the advantage that electrode 15 is not provided in the device itself, so the structure of the device can be simplified and the manufacturing steps can be reduced. FIGS. 3(a) and (b) show that the type of image display device 1, as shown in FIG. 1(b), is configured to enable applying voltage by setting it in a device capable of applying the voltage. The cross-sectional structure of the image display device of the present invention is not limited to those shown in FIGS. 1(a) and 1(b).

At the outermost part of image display device 1 of FIG. 1(a), there are provided two substrates 11 and 12 facing each other, which are parts of the housing constituting the aforesaid image display device. On each surface of both surfaces facing each other of substrates 11 and 12, electrode 15 is provided to apply voltage.

Electrodes 15 are provided on substrates 11 and 12, and there exist particles 21 and 22 in gap 18 which is formed by facing the two electrode sides of substrates 11 and 12. Further, image display device 1 of FIGS. 1(a) and 1(b) has a structure such that gap 18 is surrounded by substrates 11 and 12 and by walls 17 on four sides, whereby particles 21 and 22 exist within gap 18 in an enclosed state. Alternatively, the image display device of the present invention may contain only one kind on particles.

The size of gap 18 is not limited as long as it is within a range in which the enclosed particles are capable of migration and an image contrast can be maintained, which normally is 10-500 μm and preferably 10-200 μm. The volume occupancy of particles in gap 18 is 5-70% and preferably 10-60%. By setting the volume occupancy of particles within the above range, particles can smoothly migrate within gap 18, and an image of excellent contrast can be produced.

In the gap formed by the two opposing substrates of the image display device of the present invention, preliminarily charged particles are enclosed, and when voltage is applied between the two substrates to form an electric field, the enclosed particles migrate along the direction of the electric field. Thus, an image display is achieved by migration of charged particles via application of voltage between the substrates.

The image display in the image display device of the present invention is achieved through the following steps:

(1) Particles used for a display medium are electrically charged via commonly known methods such as triboelectric charging using carriers;

(2) The aforesaid charged particles are enclosed between two electrodes facing each other, and voltage is applied between the aforesaid electrodes;

(3) An electric field is formed between the substrates via application of voltage to them;

(4) Being drawn, along the electric field, toward surfaces of the substrates via Coulomb attraction, the charged particles migrate, whereby at image display can be achieved; and, (5) The migration direction of the charged particles can be changed by changing the electric field direction between the substrates. The image display can be variously changed by the changes of the migration direction of the charged particles.

The above-described commonly known electrical charging methods of particles include, for example, a method in which particles are electrically charged through triboelectric charging through contact with carriers, and a method in which two types of particles differing in charging characteristic are mixed and stirred with a shaker to electrically charge the aforesaid particles through triboelectric charging among the aforesaid particles.

Figure 2:
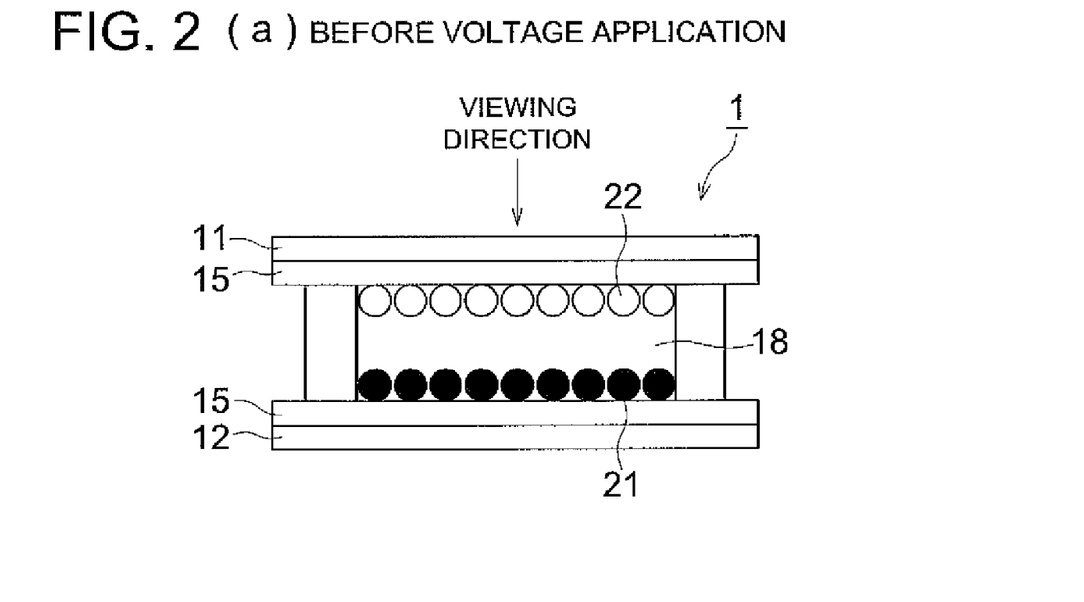
FIGS. 2(a) and 2(b) are schematic illustrations showing an example of particle migration by application of voltage between substrates

Examples of migration of particles 21 and 22, in response to application of voltage between substrates, are shown in FIGS. 2(a), 2(b), 3(a), and 3(b). FIG. 2(a) shows a state of particles before application of voltage between substrates 11 and 12, and positively charged white particles 22 exist near substrate 11, which is provided on the viewing side. This state indicates that image display device 1 displays a totally white image. Further, FIG. 2(b) shows a state of particles after application of voltage to electrode 15, and shows that negatively charged black particles 21 migrated near substrate 11 which is provided on the viewing side, and white particles 22 migrated to the side of substrate 12. This state indicates that image display device 1 displays a totally black image.

FIGS. 3(a) and (b) show states of particles before and after voltage application, respectively, where a type of image display device 1 having no electrodes therein is connected to voltage application apparatus 30. In the type of image display device 1 as shown in FIG. 1(b), similarly to image display device 1 having electrodes 15, black particles 21, which are negatively charged by application of voltage, have migrated to the vicinity of substrate 11 which is provided on the viewing side, and white particles 22, which are positively charged, have migrated to the side of substrate 12.

Subsequently, there will be explained substrates 11 and 12, electrodes 15, dividing walls 17, black particles 21 and white particles 22, which constitute image display device 1 as shown in FIGS. 1(a) and 1(b).

First, substrates 11 and 12 constituting image display device 1 will be explained. With regard to image display device 1, since the observer views images formed of particles 21 and 22 from at least one side of substrates 11 and 12, a transparent material is required for the substrate which is provided on the viewing side. Therefore, the substrate used on the viewer side is produced so that the substrate exhibits a light transmittance of 50% or more at a wavelength of 300 nm. By employing such a light transmitting substrate, image display device 1 of the present application has come to acquire high level of whiteness which has not been attained by the image display device employing polycarbonate resin or polyethylene terephthalate resin as the substrate. Also, by employing such a substrate, transmittance of 80% or more of the light in the wavelength region of 400-700 nm can be obtained. Accordingly, an excellent visibility can also be attained. In the substrates used to construct image display device 1, the substrate provided on the opposite side to the viewer side may not have the light transmittance of 50% or more at a wavelength of 300 nm.

The thickness of substrates 11 and 12 is preferably of 2 μm-5 mm and more preferably of 5 μm-2 mm. A thickness of substrates 11 and 12 within the above range provides image display device 1 sufficient rigidity, as well as enabling to maintain uniform spacing between the two substrates. Further, since a thickness of the substrates within the above range provides a compact size and light weight image display device, usage of the aforesaid image display device in a wide variety fields is promoted. Further, by setting the thickness of the substrate on the image viewing side to be within the above range, exact viewing of displayed images can be achieved, resulting in avoiding deterioration of display quality.

When a substrate exhibiting light transmittance of 50% or more at a wavelength of 300 nm is not used as the substrate provided on the opposite side to the viewer side, the material used for the substrate is not specifically limited. Specifically, when flexibility is provided on the image display device, an organic material or a metal sheet well known in the art may be used. Alternatively, inorganic materials having poor flexibility, for example, glass or quartz may also be used.

Examples of a well known organic material or a metal sheet which can provide flexibility of some extent include: polyester resins represented by polyethylene terephthalate or polyethylene naphthalate, polycarbonate resins, polyether sulphone resins, and polyimide resins. In addition, other examples include transparent resins provided by radical polymerization of polymerizable vinyl monomers such as acrylic resins and polyethylene resins, which are polymers of acrylic esters or methacrylate esters, represented by polymethylmethacrylate (PMMA).

Next, electrodes 15 constituting image display device 1 will be explained. Electrodes 15, which are provided on one surface of each of substrates 11 and 12, form an electric field by application of voltage between the electrodes, namely, gap 18. Similarly to the above-mentioned substrates, a transparent electrode is preferably provided on the viewer side.

The thickness of the electrode which is provided on the viewer side is preferably of such a level that visual light transparency is not hindered, and at the same time, electrical conductivity is ensured. Specifically, the aforesaid thickness is preferably 3 nm-1 μm, more preferably 5-400 nm. Visual light transmittance of the electrode which is provided on the image viewing side is, similarly to the aforesaid substrate, preferably not less than 80%.

It is preferable that the thickness of the electrode which is provided on the opposite side of the image viewing side is also within the above-described range, but that electrode is not required to be transparent.

Materials constituting electrodes 15 include metal materials, electroconductive metal oxides, and electroconductive polymer materials. Specific metal materials include, for example, aluminum, silver, nickel, copper, and gold. Specific electroconductive metal oxides include indium tin oxides (ITO), indium oxide, antimony tin oxides (ATO), fluorine doped tin oxide (FTO), tin oxide, and zinc oxide. Examples of electroconductive polymer materials include polyaniline, polypyrrole, polythiophene, and polyacetylene.

Methods of forming electrodes 15 on substrates 11 and 12 include, in the case of forming a thin film electrode, for example, a sputtering method, a vacuum evaporation method, a chemical vapor deposition method (the CDV method), and a coating method. Further included is a method in which an electroconductive material is mixed with a solvent or binder resin, and the resulting mixture is coated on a substrate to form the electrode.

Next, dividing walls 17 constituting image display device 1 will be explained. In image display 1, as shown in FIGS. 1(a) and 1(b), gap 18, corresponding to a space between the two substrates of the present invention, is formed by opposing substrates 11 and 12, but, if needed, gap 18 may be formed by providing one or more dividing walls 17 in such a manner that dividing walls 17 are arranged at right angles to each of the two substrates 11 and 12. Employing dividing walls 17 together with substrates 11 and 12 in the above-described way can form gap 18 of which upside, downside and remaining four sides are surrounded by the substrates and the dividing walls.

Figure 4:
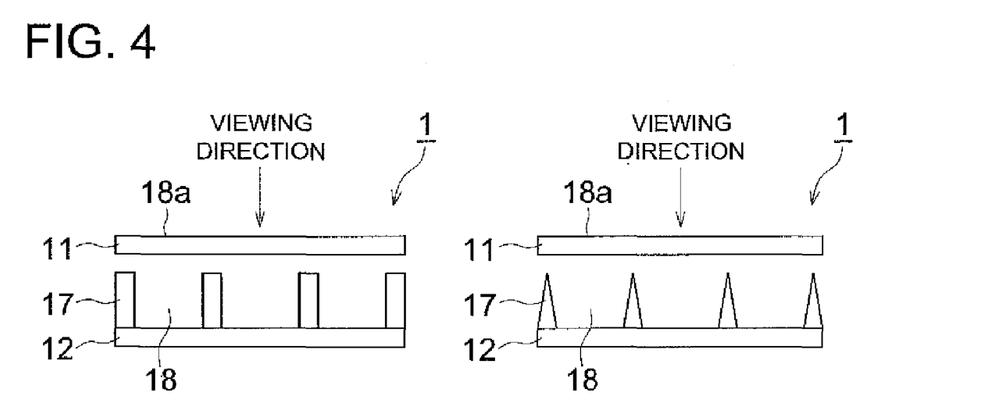
FIG. 4 is schematic cross-sectional illustrations showing examples of dividing walls
Figure 5:
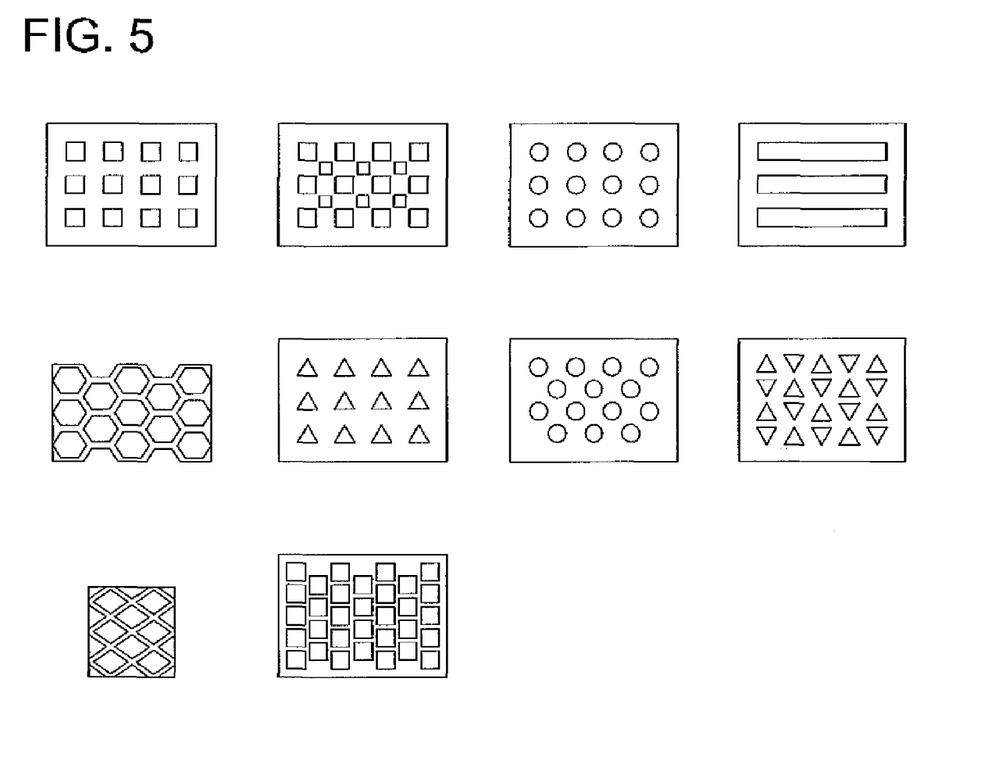
FIG. 5 illustrates examples of shapes and arrays of cells

Dividing wall 17 can be formed in various shapes as shown in FIGS. 4 and 5. Individual of gaps 18, which are separated by dividing walls 17, may also be called as a cell. The shape of a cell may be square, triangular, line shape, circular or hexagonal, and plurality of cells may be arrayed in a honeycomb arrangement or a reticulate arrangement, as illustrated in FIG. 5. It is preferable that the width, namely, the thickness, of the part of the dividing wall 17 closer to image display surface 18a is as thin as possible to ensure clearness of displayed images.

Dividing walls 17 can be formed by a processing treatment on the substrate surface which is opposite image viewing substrate 11, by employing, for example, any of the following methods, which include, for example, embossing using resin materials, formation of concave-convex surfaces by hot-press injection molding, photolithography, and screen printing.

Next, particles 21 and 22, which are enclosed within gap 18, will be explained. Two types of particles, namely white particles 22 and black particles 21 are enclosed in the image display device shown in FIGS. 1(a) and 1(b). Image display is achieved in such a manner that when voltage is applied to electrodes 15 which are provided on substrates 11 and 12, an electric field is formed within gap 18, due to which white particles 22 and black particles 21 are electrically charged by the triboelectric charging to migrate within gap 18 in response to the electric field. Thus, image display is achieved via migration of particles within gap 18 wherein an electric field has been formed. Images exhibiting contrast are provided by the image formation employing white particles 22 and black particles 21.

Methods of providing electric field (application of voltage) within gap 18 to drive particles 21 and 22 incorporated in gap 18 include, for example, but are not particularly limited to, a method, performed in image display device 1 as shown in FIG. 1(a), in which an electric field is provided within gap 18 through electrode 15 being arranged on substrates 11 and 12. On the other hand, image display device 1 as shown in FIG. 1(b) has no electrode 15 in its structure. In such a type of image display device, as described above, an electric field is formed within gap 18 by connecting image display device 1 to an apparatus having its electrodes which is outside of image display device 1 to achieve driving of particles 21 and 22.

When images are displayed with two types of colored particles, namely white particles 22 and black particles 21, migration of the two types of particles can be controlled by providing white particles 22 and black particles 21 with differing electrical characteristics via commonly known methods. Specific examples of the aforesaid methods include, for example, a method to design particles so as to change their relative position in the triboelectric series compared to carriers, and a method to select an external additives, which are added to surfaces of particles, so that the aforesaid particles may change the relative position in the triboelectric series compared to carriers.

The particle diameter of the particles used in the present invention is preferably 0.1-50 μm with respect to the volume median diameter. Setting the particle diameter of the particles within the above range provides uniform and clear images. Further, since there is no need to be concerned that the above particles cause mutual coagulation, the particles can migrate smoothly and provide images exhibiting moderate image density and contrast.

The volume median diameter ($D50_v$) of the particles is measured and calculated using an apparatus, such as Multisizer III (manufactured by Beckman Coulter Inc.) connected with a computer system for data processing.

The aforesaid measurement is carried out as follows: 0.02 g of the particles are soaked in 20 ml of a surface active agent solution, which is employed to disperse the particles and is prepared, for example, by diluting a neutral detergent containing a component of surface active agent by a factor of 10 in pure water, and the resulting mixture is subjected to ultrasonic dispersion for one minute to prepare the particle dispersion. The particle dispersion is then charged using a pipette into a beaker containing ISOTON II (produced by Beckman Coulter Inc.), placed on a sample stand, to achieve a measured concentration of 10%, followed by measurement with the count of the measuring apparatus set to 2,500. The aperture diameter of Multisizer III is set to 50 μm.

Next, materials constituting the particles which are enclosed within gap 18, formed of substrates 11 and 12, will now be explained. The particles, employed in image display device 1, contain at least a resin and a colorant. The charge is preferably provided by an action such as frictional force. Since the particles are required to display images exhibiting sufficient contrast in image display device 1, the particles are preferably colored by a colorant. Further, inorganic compound particles such as titanium oxide, or calcium carbonate may be externally added onto the surface of the particles.

The resin constituting the particles is not specifically limited. Typical examples of the resin include polymers which are referred to as vinyl resins, which will be detailed below. In addition to the vinyl resins, the resins also include condensation resins such as polyamide resins, polyester resins, polycarbonate resins, and epoxy resins. Specific examples of the vinyl resins include polystyrene resins, polyacrylic resins, polymethacrylic resins, and further include polyolefin resin which is formed of ethylene monomer or propylene monomer.

Resins other than vinyl resins include, in addition to the above-described condensation resins, polyether resins, polysulfone resins, polyurethane resins, fluorine-containing resins, and silicone resins.

The polymer constituting the resin usable for the particles may be produced by employing at least one type of the polymerizable monomers, and, in addition, may be produced in combination of plural types of polymerizable monomers. Production methods, in combination of plural types of polymerizable monomers, include, for example, a method of forming copolymers such as a block copolymer, a graft copolymer, and a random copolymer, and also include a method of forming resins via a polymer blending method in which plural types of resins are blended.

Also, the colorant used for the particles is not specifically limited, and commonly known pigments are usable. Of these, white pigments constituting white particles 22 include, for example, zinc oxide (zinc white), titanium oxide, antimony white, and zinc sulfide, of which titanium oxide is preferred. Black pigments constituting black particles 21 include, for example, carbon black, copper oxide, manganese dioxide, aniline black, and activated carbon, of which carbon black is preferred.

The production methods of the particles are not specifically limited, and the particles can be produced by application of commonly known methods for production of particles incorporating a resin and a coloring agent. Commonly known methods include, for example, a method of a toner employed for electrophotographic image formation. Specific production methods of the particles include, for example, the following:

(1) A method in which a resin and a coloring agent are kneaded to form a mixture, which mixture is then subjected to the steps of pulverization and classification to produce the targeted particles.

(2) A so-called suspension polymerization method, in which a polymerizable monomer and a coloring agent are mechanically agitated in a water-based medium to form droplets, which are then subjected to polymerization to produce the targeted particles.

(3) A so-called emulsion coagulation method, in which a polymerizable monomer is dropped into a water-based medium containing a surface active agent, which is then polymerized in micelles to produce the targeted polymerized particles of 100-150 nm, and after which, coloring agent particles and an aggregating agent are added to the aforesaid polymerized particles followed by coalescing the aforesaid polymerized particles and the aforesaid coloring agent particles.

EXAMPLES

The embodiments of the present invention will now be described with reference to examples, but the invention is by no means limited thereto.

1. Production of Image Display Devices 1-10

Image display devices to display images by employing positively charged white particles and negatively charged black particles were manufactured through the steps described below.

1-1. Production of Black Particles and White Particles (1) Production of White Particle 22

The resin and a titanium oxide described below are introduced into a Henschel mixer (manufactured by Mitsui Miike Machinery Co., Ltd.), and was subjected to a blending treatment over 5 minutes at a circumferential speed of the mixing blades being set to 25 m/second to produce a mixture.

| | |
|---|---|
| styrene acrylic resin (at weight average molecular weight of 20,000) | 100 parts by mass |
| anatase-type titanium oxide (at average primary particle diameter of 150 nm) | 30 parts by mass |

The above mixture was kneaded via a biaxial extrusion kneading machine, after which the kneaded mixture was pulverized via a turbo-mill pulverizer (manufactured by Turbo Kogyo Co., Ltd.) after initially being coarsely pulverized. After that, the resulting fine particles were subjected to classification treatment via an air classifying machine utilizing the Coanda effect, to produce white particles with a volume median diameter of 8.2 μm.

Subsequently, to the above white particles added were fine silica particles (at a number-average primary particle diameter of 50 nm), in an amount of 0.6 part by mass, which were treated with an aminosilane coupling agent, followed by a treatment with a hybridizer (manufactured by Nara Machinery Co., Ltd.) at a rotation rate of 15,000 rpm for 10 minutes. Further, added were silica particles with a number-average primary particle diameter of 15 nm, in an amount of 1.0 part by mass, which were treated with an aminosilane coupling agent, followed by a treatment similar to the above treatment, to produce White Particle 22.

(2) Production of Black Particle 21

The resin and a carbon black described below are introduced into a Henschel mixer (manufactured by Mitsui Miike Machinery Co., Ltd.), and were blended over 5 minutes at a circumferential speed of the mixing blades being set to 25 m/second to produce a mixture.

| | |
|---|---|
| styrene acrylic resin (at weight average molecular weight of 20,000) | 100 parts by mass |
| carbon black (at number-average primary particle diameter of 25 nm) | 10 parts by mass |

The above mixture was kneaded via a biaxial extrusion kneading machine, and then the kneaded mixture was pulverized via a turbo-mill pulverizer (manufactured by Turbo Kogyo Co., Ltd.), after initially being coarsely pulverized. After that, the resulting fine particles were subjected to classification treatment via an air classifying machine utilizing the Coanda effect, to produce black particles with a volume-based median diameter of 8.0 μm.

Subsequently, to the above black particles added were fine silica particles (at a number-average primary particle diameter of 50 nm), in an amount of 0.6 part by mass, which were treated with an aminosilane coupling agent, followed by a treatment with a hybridizer (manufactured by Nara Machinery Co., Ltd.) at a rotation rate of 15,000 rpm for 10 minutes. Further, added were silica particles with a number-average primary particle diameter of 15 nm, in an amount of 1.0 part by mass, which were treated with an aminosilane coupling agent, followed by a treatment similar to the above treatment, to produce Black Particle 21.

1-2. Production of Image Display Devices 1-10

(1) Production of Image Display Device 1

Two substrates each composed of a 4-methyl-1-pentene polymer with the dimension: length of 60 mm, width of 60 mm and thickness of 0.4 mm (light transmittance at a wavelength of 300 nm is 82%) were prepared. On one surface of each substrate, an electrode composed of an indium-tin oxide film of thickness of 300 nm was formed via sputtering. Hereinafter, the above two substrates are referred to as Substrates 1.

Next, the above-mentioned White Particles 22" and Black Particles 21 were separately agitated for 30 minutes with the shaking machine to triboelectrically charge White Particles 22 and Black Particles 21. White Particles 22 were positively charged and Black Particles 21 were negatively charged.

A gap was formed in such a manner that the two above-described Substrates 1 were arranged so that the electrodes faced each other and a polyethylene terephthalate board having a thickness of 50 μm which serving as a dividing wall was sandwiched between the Substrates 1 at one edge portion of Substrates 1. Two Substrates 1 and the polyethylene terephthalate board were adhered each other by using a UV-curable adhesive and by applying UV rays of 300-400 nm. In thus formed gap, a mixture of White Particles 22 and Black Particles 21 were charged so that each volume occupancy of White Particles 22 and Black Particles 21 was 15%, followed by sealing the edge of Substrates 1 which had not been sealed using a polyethylene terephthalate board having a thickness of 50 μm. Also in this case, a UV-curable adhesive was used to glue them. Thus, Image Display Device 1 was produced.

(2) Production of Image Display Devices 2-10

Each of Image Display Devices 2-7 was produced in a similar manner to the production of Image Display Device 1 except that each of Substrates 2-7 produced by employing each copolymer resin described below were respectively used, instead of Substrates 1. The dimension of each of Substrates 2-7 was 60 mm in length, 60 mm in width and 0.4 mm in thickness.

Substrate 2; 4-methyl-1-pentene/1-decene (Compound 2)/1-tetradecene (Compound 4) copolymer (copolymer ratio=90/5/5)

Substrate 3; 4-methyl-1-pentene/1-octene (Compound 3)/1-decene (Compound 2) copolymer (copolymer ratio=30/5/15)

Substrate 4; 4-methyl-1-pentene/1-decene (Compound 2)/1-tetradecene (Compound 4) copolymer (copolymer ratio=75/10/15)

Substrate 5; 4-methyl-1-pentene/(Compound 1)/1-decene (Compound 2) copolymer (copolymer ratio=80/10/10)

Substrate 6; 4-methyl-1-pentene/(Compound 5)/(Compound 4) copolymer (copolymer ratio=90/5/5)

Substrate 7; 4-methyl-1-pentene/(Compound 6)/(Compound 9) copolymer (copolymer ratio=80/10/10)

Each copolymer ratio represents a mass ratio. Each of Substrates 1-7 is a "transparent substrate".

Image Display Device 8 was produced in a similar manner to the production of Image Display Device 1 except that Substrates 8 composed of polyethylene terephthalate resin was used, instead of Substrates 1. Image Display Device 9 was produced in a similar manner to the production of Image Display Device 1 except that Substrates 9 composed of polycarbonate resin was used, instead of Substrates 1. Image Display Device 10 was produced in a similar manner to the production of Image Display Device 1 except that Substrates 10 composed of quartz glass was used, instead of Substrates 1. The dimension of each of Substrates 8-10 was 60 mm in length, 60 mm in width and 0.4 mm in thickness. The light transmittance at a wavelength of 300 nm of one of the substrates used in each of Image Display Devices 1-10 was measured by using a commercially available spectrophotometer UV-2200A (produced by Shimadzu corp.).

Thus Image Display Devices 1-10 were manufactured via the above steps.

2. Experimental for Evaluation

Image Display Devices 1-7 were designated as Examples 1-7 and Image Display Devices 8-10 were designated as Comparative Examples 1-3.

2-1. Evaluation 1 (Evaluation of Display Characteristics)

Display characteristic of each image display device was evaluated by applying a direct-current voltage according to the following steps, followed by measuring the reflection density of each image obtained by applying the voltage. The application of voltage was carried out via the steps described below so that a hysteresis loop was drawn, in which the applied voltage was varied from 0 V to the positive voltage region, followed by dropping down to the negative voltage region, and after that, applied voltage was returned again to 0 V, namely;

(1) the voltage is increased from 0 V to +100 V at intervals of 20 V;

(2) the voltage is decreased from +100 V to −100 V at intervals of 20 V; and (3) the voltage is increased from −100 V to 0 V at intervals of 20 V.

While the direct-current voltage was applied to each image display device according to the above-described steps, it was confirmed that the display changed from white to black when a positive voltage was applied to the image display device displaying white.

Evaluation was conducted for display characteristics of black density, white density and contrast, wherein black density refers to the reflection density of the display surface when voltage of +100 V is applied to the electrode located on the viewer side of the image display device, and white density refers to the reflection density of the display surface when voltage of −100 V is applied.

Contrast is defined by the difference between the black density produced at the above step (1) and the white density produced at the above step (2). That is, it is defined by the equation:

Contrast=[black density provided at step(1)]−[white density provided at step(2)].

Reflection densities were measured at 5 points on the display surface using a reflection densitometer RD-918 (manufactured by Macbeth Co.). The average of obtained 5 densities was evaluated as an absolute value. The reflection density of a standard white board was used as a standard value in the reflection density measurement using the reflection densitometer RD-918. The values of: a white density of 0.4 or less; a black density of 1.30 or more; and a contrast of 0.70 or more, were evaluated as acceptable.

2-2 Evaluation 2 (Evaluation of Flexibility)

Figure 1:
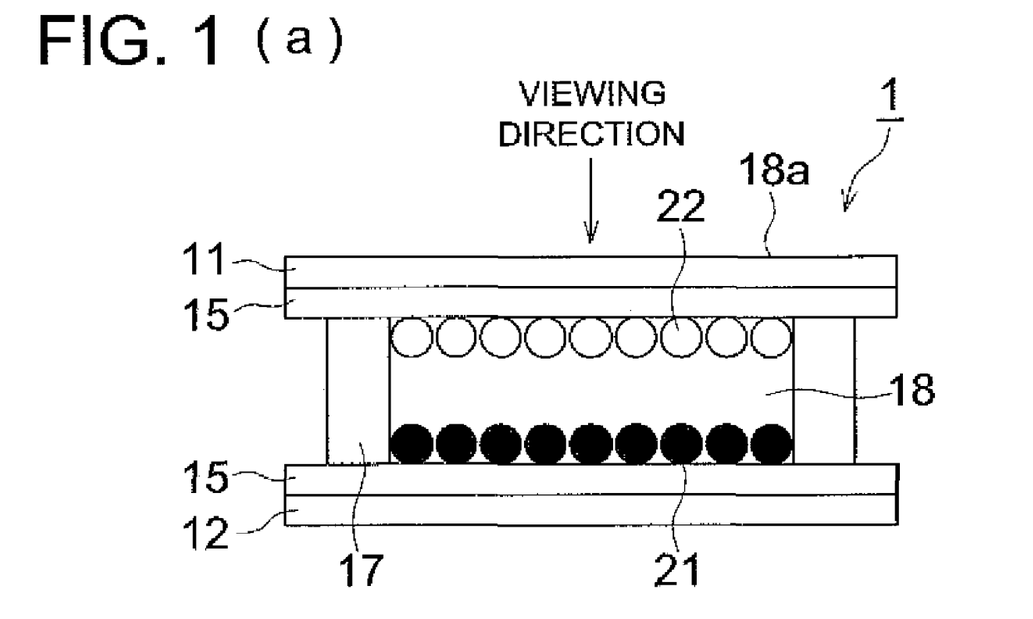
FIGS. 1(a) and 1(b) each are schematic drawings showing an example of the cross-sectional constitution of an image display device

Image Display Devices 1'-10' each having the cross-sectional constitution shown in FIG. 1(*b*) were produced in the same manner as described for the production of Image Display Devices 1-10, except that the thickness of each substrate was changed to 0.2 mm and formation of the electrode on each substrate was not conducted. Image Display Devices 1'-10' each were bent to a curvature radius of 20 mm, followed by carrying out the evaluation of flexibility. The voltage was applied from outside by using outer electrodes on each of Image Display Devices 1'-10'. The image display device which exhibited the same display characteristic as that obtained before bending while being bent was evaluated as "acceptable" (designated as A). The image display device which could not be bent to a curvature radius of 20 mm, or the image display device which did not show the same display characteristic as that obtained before bending while being bent was evaluated as "unacceptable" (designated as B).

When the same evaluation as those for Image Display Devices 1-10 were carried out for Image Display Devices 1'-10' before conducting the above bending tests, the same result was obtained for each of image Display Devices 1'-10' as that of corresponding image display device of Image Display Devices 1-10. Accordingly, Image Display Devices 1'-7' were included in Examples 1-7 and Image Display Devices 8'-10' were included in Comparative Examples 1-3.

The above results are shown in following Table 1.

TABLE 1

| Image Display Device No. | Light transmittance at 300 nm | Evaluation of display | | | Flexibility Evaluation |
|---|---|---|---|---|---|
| | | White density | Black density | Contrast | |
| Example 1 | 1 | 82 | 0.18 | 1.39 | 1.21 | A |
| Example 2 | 2 | 82 | 0.19 | 1.39 | 1.20 | A |
| Example 3 | 3 | 77 | 0.22 | 1.38 | 1.16 | A |
| Example 4 | 4 | 50 | 0.33 | 1.37 | 1.04 | A |
| Example 5 | 5 | 52 | 0.32 | 1.38 | 1.06 | A |
| Example 6 | 6 | 53 | 0.31 | 1.37 | 1.06 | A |
| Example 7 | 7 | 60 | 0.24 | 1.37 | 1.13 | A |
| Comp. 1 | 8 | 35 | 0.60 | 1.24 | 0.64 | A |
| Comp. 2 | 9 | 28 | 0.70 | 1.25 | 0.55 | A |
| Comp. 3 | 10 | 80 | 0.17 | 1.38 | 1.21 | B |

Comp.: Comparative Example

As shown in Table 1, each image display device of Examples 1-7 corresponding to the present invention exhibited white density of 0.40 or less, which was not obtained by neither of Comparative Examples 1 and 2 in which polyester resin or polycarbonate resin was used as the substrate. It should be noted that, in Examples 1 and 2, the same level of whiteness as that of Comparative Example 3 employing a quartz glass substrate was obtained.

Each image display device of Examples 1-7 exhibited a black density of 1.30 or more and a contrasts of 1.00 or more, both of which are notably higher than the acceptable levels prescribed in the present invention. On the other hand, the image display device of the Comparative Examples 1 and 2 showed lower black densities than those of Examples 1-7 and lower contrasts smaller than 0.70.

As described above, large differences were observed between the display characteristics of Image Display Devices 1-7 which are inventive examples and those of Comparative Examples 1 and 2 in which polyester resin or polycarbonate resin was used as the substrate.

Further, while the inventive image display devices of Examples 1-7 were found to show that image display was possible even after bending the display device, the image display device of Comparative Example 3 employing quartz glass as the substrate could not even bend the display device.

What is claimed is:

1. An image display device comprising:
   (i) a pair of substrates facing each other; and
   (ii) particles placed in a gap between the substrates,
   wherein at least one of the substrates is a resin substrate which is transparent and exhibits a light transmittance of 50% or more at a wavelength of 300 nm;
   wherein the resin substrate comprises at least one of a homopolymer of 4-methyl-1-pentene and a copolymer of 4-methyl-1-pentene and an α-olefin having 6 to 16 carbon atoms.

2. The image display device of claim 1, wherein the resin substrate comprises the homopolymer of 4-methyl-1-pentene.

3. The image display device of claim 1, wherein the resin substrate comprises the copolymer of 4-methyl-1-pentene and an α-olefin having 6 to 16 carbon atoms.

4. The image display device of claim 1, wherein the ratio a/b is 4 or more in the copolymer of 4-methyl-1-pentene and an α-olefin having 6 to 16 carbon atoms,
   wherein
   a: mass content of 4-methyl-1-pentene
   b: mass content of the α-olefin having 6 to 16 carbon atoms.

5. The image display device of claim 1, wherein the resin substrate comprises a copolymer of 4-methyl-1-pentene and at least one of the following compounds 1-9:

COMPOUND 1
$H_2C=CHCH_2CH_2CH_2CH_3;$
(α) (β) (γ) (δ) (ε) (ζ)

COMPOUND 2
$H_2C=CHCH_2(CH_2)_6CH_3;$

COMPOUND 3
$H_2C=CHCH_2CH_2CH_2CH_2CH_2CH_3;$

COMPOUND 4
$H_2C=CHCH_2(CH_2)_{10}CH_3;$

COMPOUND 5
$H_2C=CHCH_2(CH_2)_{12}CH_3;$

COMPOUND 6
$H_2C=CHCH_2CH_2CH_2CH_2CH_3;$

COMPOUND 7
$H_2C=CHCH_2CH_2CH_2CHCH_3;$
$\quad\quad\quad\quad\quad\quad\quad\quad |$
$\quad\quad\quad\quad\quad\quad\quad\quad CH_3$ COMPOUND 8
$H_2C=CHCH_2CH_2CHCH_2CH_3;$
$\quad\quad\quad\quad\quad\quad\quad |$
$\quad\quad\quad\quad\quad\quad\quad CH_2CH_2CH_3$ COMPOUND 9
$H_2C=CHCH_2CHCH_2CH_3;.$
$\quad\quad\quad\quad\quad |$
$\quad\quad\quad\quad\quad CH_3$ 6. The image display device of claim 1, wherein the resin substrate exhibits a light transmittance of 80% or more at a wavelength of 400 nm.

7. The image display device of claim 1, wherein a thickness of the resin substrate which is transparent and exhibits a light transmittance of 50% or more at a wavelength of 300 nm is 0.4 to 5 mm.

* * * * *